April 2, 1957  J. V. FISHER  2,787,567
MACHINE FOR MAKING ELECTRICAL TRANSMISSION LINES
Filed Sept. 18, 1951
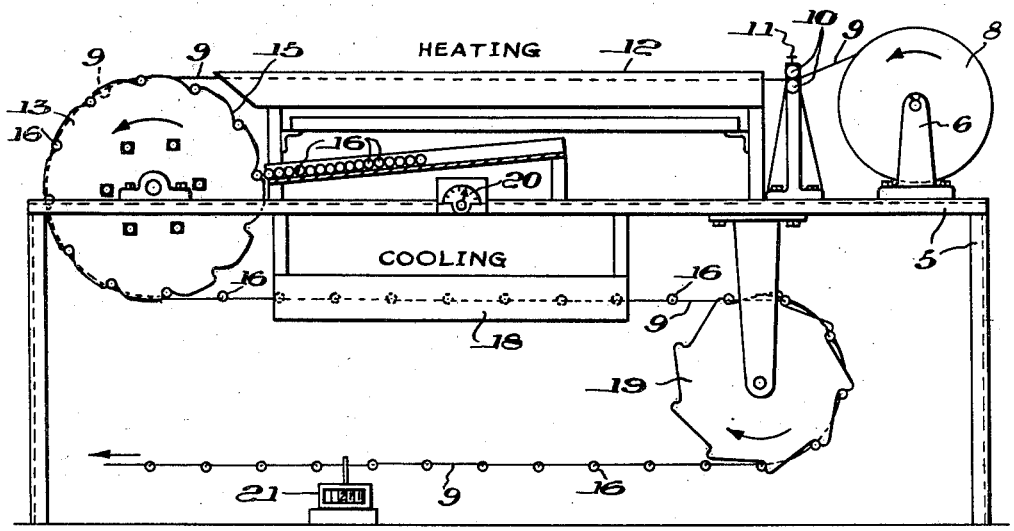
Fig. 1.
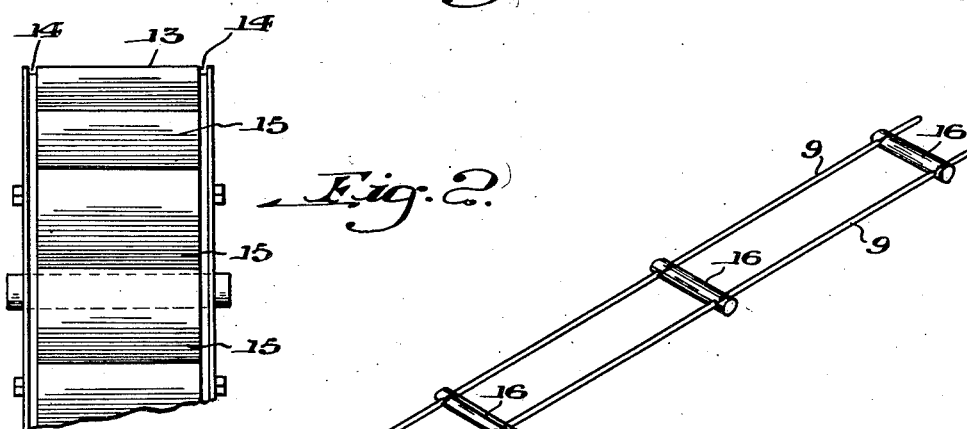
Fig. 2.
Fig. 3.
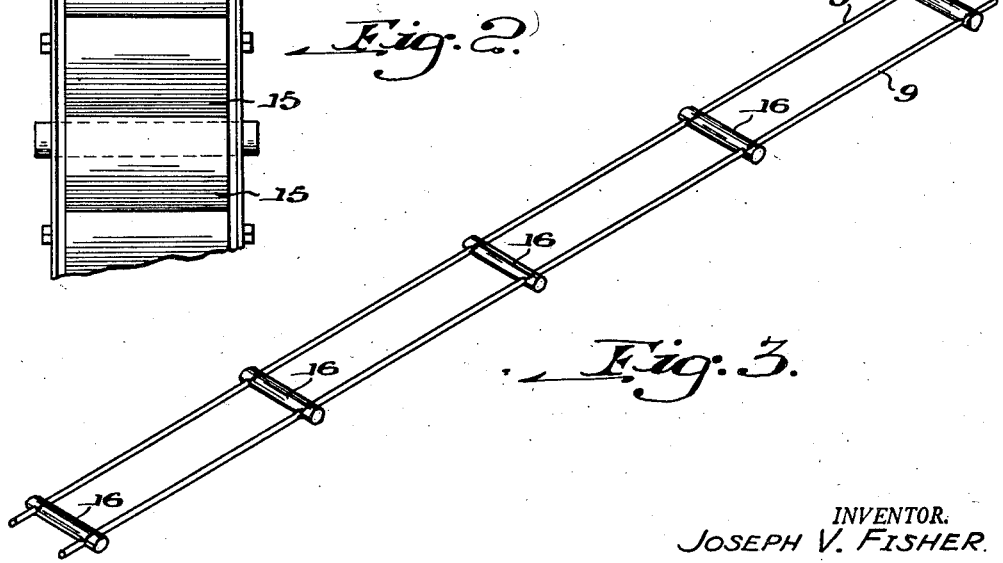
INVENTOR.
JOSEPH V. FISHER.
BY Archworth Martin
his ATTORNEY.

United States Patent Office 2,787,567
Patented Apr. 2, 1957

2,787,567

MACHINE FOR MAKING ELECTRICAL TRANSMISSION LINES

Joseph V. Fisher, Pittsburgh, Pa., assignor to Fretco, Inc., Pittsburgh, Pa., a corporation of Pennsylvania Application September 18, 1951, Serial No. 247,064

3 Claims. (Cl. 154—2.24)

My invention relates to the making of electrical conductors for transmission lines, including electrical conductors used in connection with television and radio transmission and receiving sets, the conductors being employed for connecting the antenna to a transmitter or a receiver. These devices are commonly designated as "open-wire" transmission and receiving lines. The conductor can, of course, be put to other uses.

A convenient form of open-wire line embodies a pair of conductor wires unitarily connected at intervals along their lengths by bars of insulating material.

My invention has for its object the provision of a machine that may be continuously operated to unitarily connect a pair of conductor wires to insulating bars such as those formed of thermoplastic materials, and also the provision of an improved method for connecting electrical conductors to insulating members.

In the accompanying drawing, Figure 1 is a side view of the machine; Fig. 2 is an enlarged end view of the machine of Fig. 1, and Fig. 3 is a plan view of an open-wire line made on the machine.

The machine is here shown as in side elevation, but it will be understood that it can be turned to various other positions, as for example on its side. The apparatus comprises a framework 5 having pedestal bearings 6 for supporting spools 8 upon which the conductor wires 9 are wound for withdrawal during operation of the machine. Guide rolls 10 are provided for the wire and are tensionable with respect thereto by a tension screw 11, to exert some braking effect on the wire and thus prevent overrunning or whipping movement.

The wires are heated electrically or by some combustible fuel while passing through a chamber 12. A drum 13 has grooves 14 formed therein to receive the wires and pockets 15 to receive insulator bars 16 that are automatically dropped one by one into the pockets 15 during rotation of the drum. These bars are of suitable insulating material such as a thermoplastic resin.

The wires 9, in passing through the chamber 12, become heated sufficiently to soften the bars 16 somewhat, so that they will be drawn into the bars to a depth limited by the depth of the grooves 14. The material of the bars becomes softened to such an extent in the vicinity of the wires that, upon imbedment of the wires therein, the resin at the outer sides of the wires, will sag back into position where it will overlie the wires and thereby retain the parts in assembled relation.

The assembled elements are then drawn through a cooling chamber 18 where the resinous material is quickly hardened to its original condition and danger of accidental displacement of the wires thereby avoided. A sprocket wheel 19 has toothed engagement with the bars 16 and is driven by a suitable motor to pull the wires from the spools 8 and rotate the drum 13. The speed of the driving motor, which will be dependent upon the rate at which the wires can be heated in the chamber 12, will be regulated by a suitable rheostat or other control device as indicated at 20. Also, the footage of the assembled product can be automatically registered by a counter 21 which is actuated a step each time that one of the bars 16 passes it. The completed product, after it passes the counter 21, can conveniently be wound upon a reel.

I claim as my invention:

1. Apparatus for assembling electrical conductors, comprising a drum having a pair of axially-spaced grooves therein for receiving wires, a heating device for wires, pockets in the periphery of the drum for receiving thermoplastic insulator bars in position to extend across the grooves and behind the wires to partly imbed the same, a cooling chamber, and a sprocket device engageable with the assembled bars and the wires to pull the wires past the heating device and through the cooling chamber, the grooves intersecting the pockets at approximately midway between the bottoms of the pockets and their outer planes.

2. Apparatus for assembling electrical conductors, comprising a drum having a pair of axially-spaced grooves therein for receiving wires, a heating device for wires, pockets in the periphery of the drum for receiving thermoplastic insulator bars in position to extend across the grooves and behind the wires to partly imbed the same, and a pulling device engageable with the assembled bars and the wires to pull the wires past the heating device, the grooves intersecting the pockets at approximately midway between the bottoms of the pockets and their outer planes.

3. Apparatus for assembling conductors, comprising a drum having pockets in its periphery for receiving thermoplastic bars, means for continuously rotating the drum and for simultaneously advancing wires along a path that is tangential to the drum and pulling them against the bars, in partly encircling relation to the drum, and means for heating the wires during their travel through said tangential path, to such degree that they will become imbedded in the bars by the pulling force.

References Cited in the file of this patent

UNITED STATES PATENTS

| | | |
|---|---|---|
| 242,894 | Delany | June 14, 1881 |
| 265,130 | Nichols | Sept. 26, 1882 |
| 868,157 | Bishopric | Oct. 15, 1907 |
| 1,298,644 | Beaver | Apr. 1, 1919 |
| 1,702,229 | Moulton | Feb. 12, 1929 |
| 1,739,246 | Majce | Dec. 10, 1929 |
| 1,884,069 | Mendel | Oct. 25, 1932 |
| 2,336,744 | Manning | Dec. 14, 1943 |
| 2,361,374 | Abbott | Oct. 31, 1944 |
| 2,527,183 | Gardner | Oct. 24, 1950 |

FOREIGN PATENTS

| | | |
|---|---|---|
| 373,423 | Great Britain | May 26, 1932 |